Figure 1:
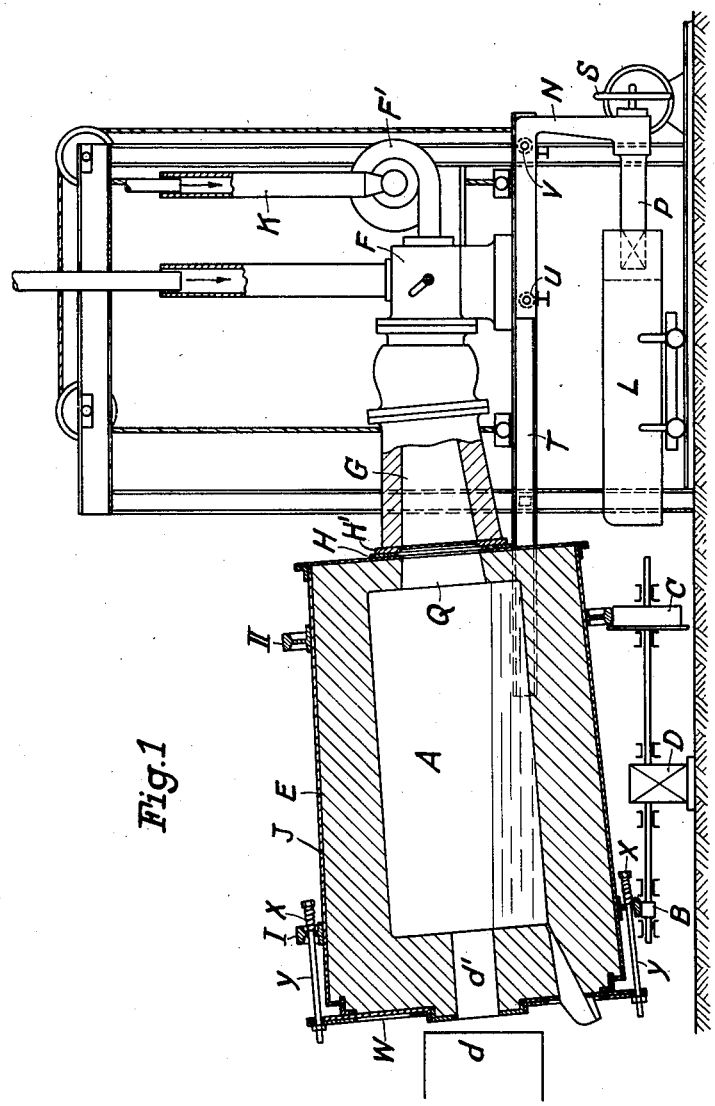

June 21, 1932.  E. WEISS  1,863,952

ROTARY FURNACE

Filed Sept. 10, 1930  3 Sheets-Sheet 1

Inventor:
E. Weiss
Atty.

June 21, 1932.  E. WEISS  1,863,952
ROTARY FURNACE
Filed Sept. 10, 1930   3 Sheets-Sheet 2

Inventor:
E. Weiss

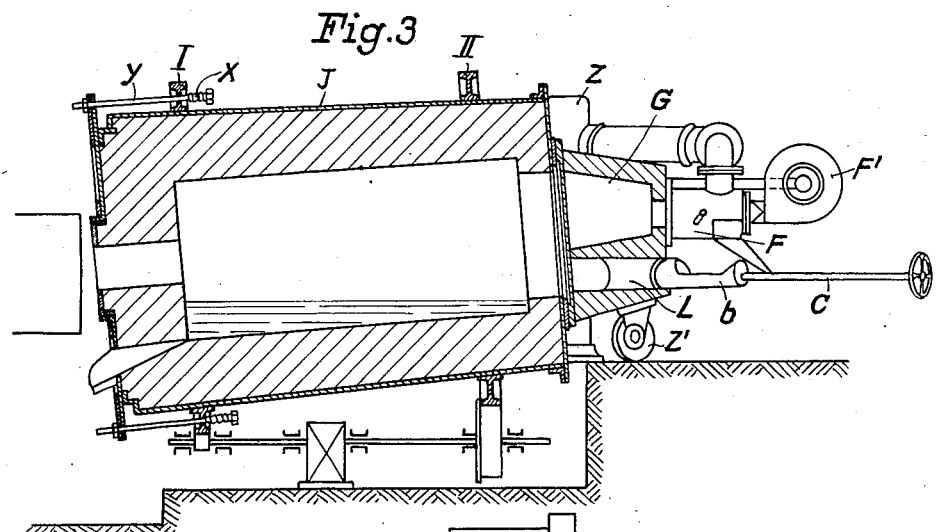
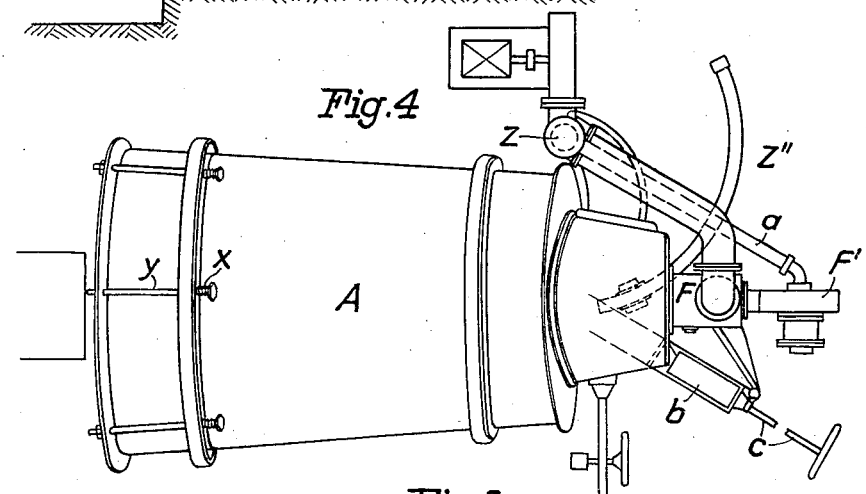
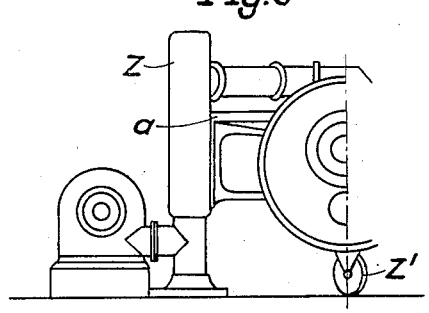

Patented June 21, 1932

1,863,952

UNITED STATES PATENT OFFICE

ERNST WEISS, OF WETHMAR, NEAR LUNEN, GERMANY

ROTARY FURNACE

Application filed September 10, 1930, Serial No. 481,033, and in Germany September 16, 1929.

Rotary furnaces for the smelting of iron and metals without separate ignition or combustion chambers, that is, those in which the ignition takes place in the smelting space itself, must naturally have a greater length than those provided with a separate combustion chamber. Furthermore, furnaces of the former kind require a comparatively small opening at the burner side corresponding to the diameter of the burner. The gas exit opening of the furnace must also be kept within small limits since experience shows that there must be a certain excess pressure in the combustion space of the furnace. These three details, length of the furnace, and small openings in the combustion and exhaust gas ends, make the question of charging extraordinarily difficult if recourse be not taken to charging through the furnace jacket. This solution is not economical for continuous working since the opening and closing of such a charge opening takes much too long and costs too much. The charging difficulty has hitherto only been overcome by using the gas exit opening, and for this purpose a separate narrow fire-resisting ring was used which, with each charge, had to be undone and again closed. The furnace was then tilted on its longitudinal axis over to 45 to 50° and the material inserted in. In this, there was primarily the above-mentioned difficulty that the narrow piece had each time to be undone and again applied, while in addition there was the further difficulty that especially the heavy and somewhat round pieces of the iron charge, rolled through the furnace up to the burner into the space which should actually be regarded as the ignition space. The consequence of this was that the ignition took place very incompletely until the pieces lying in front of the burner had been brought to a corresponding temperature, which led to great trouble and to a considerable waste of fuel.

In order to overcome this difficulty the charging has been effected, also with an inclined position of the furnace, through the burner opening. For this purpose, the burner was movably arranged in the horizontal position, and the furnace opening on the burner side was made as large as it possibly could be. This has been made as large as 500 mm. diameter. But even with this opening the charging gave rise to great difficulties since compact and roundish pieces of the material to be smelted behaved quite differently during charging from perfectly jagged pieces. In particular the lumpy and jagged pieces penetrated into the lining and became heaped up in front of the burner opening. The stirring and moving forward of this with rods and the like is very difficult since, owing to the inclined position of the furnace, the whole heat of the previous smelting which is still in the furnace lining, radiates out upwards. The upward directed furnace acts as a chimney.

The greatest drawback, however, has been found to be the extraordinary damage which is caused by the falling of the cold material to be smelted into the furnace over the lining of the latter still often white hot. Even with the vertical cupola furnaces, a great deal of wear of the furnace lining is caused by the mechanical disturbance due to the downward sliding of the charge. With these furnaces, however, the friction is much less than with the inclined ones, and furthermore the tearing of the wall by the jagged iron pieces is reduced by the intermediate and somewhat more rounded pieces of coke.

According to previous experience with rotary smelting furnaces, it has now been satisfactorily determined that the economy of the process depends in a large degree on the durability of the furnace lining.

Finally, it may be pointed out that the best possible combustion can only be carried out in a combustion space suitably formed for the production of the flames. When the ignition and combustion space depends upon the conditions of introduction of the material to be smelted, the economical combustion must suffer.

According to the invention, all these defects are obviated by the fact that in a rotary furnace with inclined axis of rotation and furnace axis having the burner opening at the upper end of the axis, the latter serves simultaneously as the charging opening, while the exhaust gas opening is at the lower end of the axis. In this way, a comparatively large opening is available for the burner opening, through which a charging trough for feeding the furnace can be run in. In order to charge the furnace, it is no longer necessary to tilt the furnace and to shovel in the material.

A further characteristic of the invention consists in arranging a detachable burner chamber so as to be moved up and down, in the latter case into engagement with the burner opening. This method of removing the burner chamber is particularly advantageous with the inclined furnace as it can take place without friction.

It is, furthermore, of considerable importance that the burner chamber by being rotatable with regard to the burner, can rotate with the smelting furnace itself. In this way, the joint packing difficulties between the furnace face and the dividing chamber otherwise arising, are obviated.

Finally, the improved smelting furnace presents the further characteristic that the burner and combustion chamber in moving away from the burner, at the same time brings the charging apparatus into position. In this way, a particularly rapid charging of the furnace is made possible.

It is further recognized with rotary smelting furnaces that the refractory stone lining expands on heating much more than the surrounding iron jacket. The longer the furnace the more difficult it is to overcome this circumstance which frequently leads to the shearing of rivets and even to fracture of the furnace casing.

According to the invention, consequently, the rotary smelting furnace is so formed that it can easily take up the expansion of the masonry or lining material consequent upon the heating. This is attained by the furnace casing increasing in size conically towards the exhaust gas end being closed by a cover held resiliently in place, and known in itself. On heating, therefore, the masonry or lining material can easily expand towards the wider furnace end without the danger of considerable friction on the furnace casing. By the projection of the masonry from the furnace jacket, there is, furthermore, allowed on account of the conical shape of the furnace, a little play between the furnace jacket and the masonry which is sufficient to take up the radial expansion of the furnace lining.

The invention has for its object, finally, so to construct the rotary furnace that during the working shift, definite quantities of the smelt may be withdrawn at intervals of time fixed as desired, and at previously determined conditions and temperature. Before the commencement of the work of the moulder and founder, such a quantity of the smelt is melted down that the cold or preheated smelting material added in the smallest possible separate quantities to replace the materials drawn out in the casting does not withdraw more heat from the bath than the quantity of heat supplied to the furnace in the same unit of time. The supply of heat can be suited with ease to the working process by means of an adjustable fuel and combustion air regulation. By means of the rotation of the furnace, any irregularity in the bath is reduced. Nevertheless, the supply of the material for smelting takes place at the end of the furnace opposite to the tap hole. The supply of fresh smelting material is stopped when the contents of the furnace are sufficient for the tapping up to the end of the tapping period shift. In general, in iron smelting a longer retention of heat will produce an improvement in the properties of the iron. Any undesired appearances are compensated by suitable additions which can be made at either furnace end as required.

A furnace constructed according to the invention is shown on the drawings as an example. In which Fig. 1 shows the furnace in longitudinal section in the working position, Fig. 2, the furnace in longitudinal section in the charging position, Fig. 3 is a cross-section of a further embodiment of the smelting furnace, Fig. 4 is a plan view of Fig. 5, Fig. 5 is an end view of the corresponding combustion and charging body in front elevation.

Figure 2:
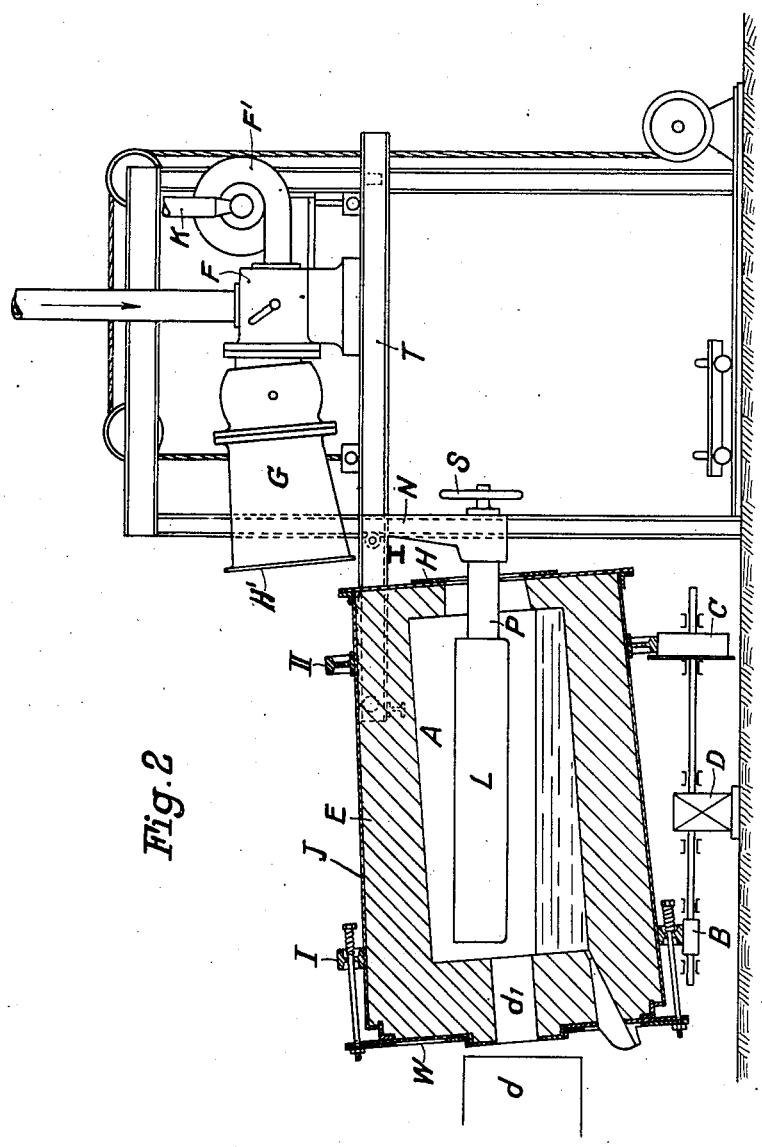

With the embodiment of the smelting furnace according to Figs. 1 and 2, the furnace A rotates on the rollers B and C, which are driven quickly or slowly as desired, by the driving means D and engage respectively the rings I and II fixed to the furnace casing. The furnace is so dimensioned that it takes the desired quantity of material, and is fitted with a lining E, within a jacket J, best suited for the materials being melted at the time. The combustion chamber G is so journaled to the burner F that after coming to rest on the furnace with the surface of a ring H' secured thereto engaging the surface of a ring H on the furnace, said chamber G rotates with said furnace. The flame is formed in the combustion chamber, which must therefore be dimensioned according to the fuel and be lined with a refractory fire-resisting lining which does not of course need to be capable of resisting falling, shifting or slipping smelting material or the slag. By means of the space for the flame formation, quite independent of that for the charging, the best possible combustion is ensured.

When, as is shown in Fig. 2, the burner with the combustion chamber is raised vertically upwards from the furnace, the fuel supply pipe K fits telescopically into itself. The burner and combustion chamber are mounted on a displacement frame T the underside of this frame being provided with a feeding arrangement N, P, L. When the latter rises, it leaves the large furnace opening Q, R free and the charging trough comes in front of the opening and can be run in. Conveniently two parallel rails T are provided, although only one is shown on the drawings, and on each rail there slides one arm N of the feeding arrangement by means of the wheels U, V. The two parallel arms are connected for stiffening purposes by means of I-section bars N'.

Fig. 2 shows the installation during the charging. The charging trough L is still in the furnace, and has emptied out the material by being turned over by means of the wheel S, and, now empty, is again run out of the furnace by means of the feed arrangement N, P, L. The rails T carrying the burner, burner chamber and feed arrangement are then lowered by means of the connecting cables T' of the hoist.

The resiliently held cover W is arranged at the wider exhaust gas end of the conical furnace A or jacket end element. The cover W is held by supports X for example springs under the nuts of the fixing bolts Y against the furnace lining with only just sufficient pressure so that on cooling it does not drop out.

The waste products pass out through the aperture $d^1$ in the larger end of the furnace opposite the burner into a similarly arranged exit passage $d$. The melted product is drawn off through the outlet $A^1$.

In the form of construction of the smelting furnace according to Figs. 3–5, the furnace A is set in rotation by the pairs of supporting rollers B or C, in known manner. The adjustable burner F with the blast F', the combustion chamber G and the charging pipe or pipes L are built into one body which rests concentrically with a circular surface on the furnace and may be packed with jointing material as desired. The whole of the above-mentioned body is rotatably fixed by means of an arm on a vertical column Z and is supported on a roller Z' at the bottom towards its centre of gravity. This supporting roller runs on a rail Z", fixed to the foundation concentrically to the vertical column Z. The arm $a$ is tube shaped so that the fuel, for example oil gas, or coal dust, can be carried through it from the column to the burner. In the charging pipe is arranged an axially displaceable carrier $b$ to take small quantities of material for adding to the furnace in such manner that the opening to the furnace is always closed even in the position shown when a charge is being inserted. When the charge is made, the cartridge $b$ is pushed forward by the rod $c$, so that the material for smelting lying in the cartridge is pre-heated by the combustion chamber. When the replenishing is to take place, the cartridge is pushed forward into the furnace, and its contents emptied into the bath by turning over.

The whole working process is as follows:

According to the size of the furnace, it is filled for a corresponding time before the shift, by hand or mechanically, through the opening on the burner side. The whole body with burner, combustion chamber, charging pipe, etc., is for this purpose rotated away from the furnace about the upright column, and is rotated back again after the charging is finished. As soon as the withdrawal of the molten material begins, the replenishing through the supply troughs or the like is started and continued until the contents of the furnace suffice for the remainder of the pieces still to be cast.

The waste heat passes through the centre of the larger end lying opposite to the burner into an exhaust pipe correspondingly arranged and indicated on the drawing by $d$.

I claim:

1. Rotary furnace for smelting metals comprising a melting chamber, with a burner opening at the upper end said chamber being rotatable about an inclined axis, a detachable combustion chamber adapted to be brought against said opening, said combustion chamber being rotatable in unison with the melting chamber.

2. Rotary furnace for smelting metals comprising a rotatable melting chamber with a burner opening and rotatable on an inclined axis, a displaceable combustion chamber adapted to engage the burner opening, said combustion chamber being rotatable with the melting chamber and means for withdrawing the combustion chamber from said opening in the melting chamber.

3. Rotary smelting furnace comprising a furnace chamber rotatable about an inclined axis, a burner, a combustion chamber detachable from said furnace but adapted to rotate in unison therewith, means for withdrawing said combustion chamber together with the burner from an opening in said furnace chamber and means for charging said furnace after removal of said combustion chamber and burner.

4. Rotary smelting furnace comprising an axially inclined melting chamber having a burner opening in the upper end thereof, a burner, a combustion chamber adapted to be placed over said burner opening and to rotate in unison with the melting chamber and means for charging comparatively small quantities of fuel into said melting chamber to compensate for quantities of liquid material withdrawn.

5. Rotary smelting furnace comprising a melting chamber rotatable about an inclined axis having a burner opening at the higher end, a combustion chamber and burner adapted to be placed over said burner opening, means for sliding said combustion chamber and burner away from said burner opening, and means displaceable in unison with said combustion chamber for charging the melting chamber.

6. Rotary smelting furnace comprising a melting chamber rotatable about an inclined axis having a burner opening at the higher end, a combustion chamber adapted to be brought into engagement with said opening and rotatable in unison with said melting chamber, a burner connected with said combustion chamber, means for sliding the combustion chamber upwardly away from the burner opening in the melting chamber, a charging trough adapted to be raised in unison with the combustion chamber and burner, means for projecting said trough into the melting chamber, means for rotating said trough to cause discharge of the contents into the melting chamber and means for rotating the melting chamber.

7. Rotary smelting furnace comprising a melting chamber, rotatable about an inclined axis having a combined burner and charging opening at the higher end, a pivotally carried burner and combustion chamber adapted to be brought into engagement with said burner opening, and means for charging quantities of material to be smelted into the melting chamber.

8. Rotary smelting furnace comprising a melting chamber rotatable about an inclined axis having a burner opening at the higher end, a combustion chamber and burner carried on a substantially vertically arranged pillar, said combustion chamber being adapted to be placed over the burner opening, a wheel and rail adapted to support the combustion chamber and burner during movement thereof towards or away from the burner opening, a gas exit opening being provided at the lower end of said melting chamber, a displaceable trough associated with said combustion chamber in which a supplementary charge may be placed, and means for rotating said trough so as to cause discharge of the contents into the melting chamber.

9. A furnace for smelting metals comprising a rotatable melting chamber arranged on an inclined axis and adapted to contain a supply of molten metal, a metal withdrawal passage, a burner, a combustion chamber adapted to be removably engaged with a burner opening in the melting chamber, and means for charging said furnace when the combustion chamber has been brought out of engagement with the burner opening.

10. A furnace for smelting metals comprising a rotatable melting chamber arranged on an inclined axis and constructed to retain a bath of molten metal therein, a passage to permit predetermined amounts of such metal to be withdrawn, a combined burner and combustion chamber, the latter journaled to rotate relatively to the former, means for causing engagement between the mouth of said combustion chamber and a burner opening in the melting chamber, and means for charging said melting chamber when the combustion chamber is out of engagement with the burner opening.

11. Rotary furnace for smelting metals comprising a furnace chamber adapted to contain a bath of molten metal and rotatable upon an inclined axis, a burner, a combustion chamber detachable from said furnace, means for withdrawing said combustion chamber together with the burner from an opening in said furnace chamber, and means for charging said furnace after removal of said combustion chamber and burner.

12. Rotary smelting furnace comprising an axially inclined melting chamber adapted to contain a supply of molten metal having a burner opening in the upper end thereof, a burner, a combustion chamber adapted to be placed over said burner opening, and means for charging comparatively small quantities of material into said melting chamber to compensate for quantities of liquid material withdrawn

ERNST WEISS.